(12) United States Patent
Iwaki et al.

(10) Patent No.: US 6,705,160 B2
(45) Date of Patent: Mar. 16, 2004

(54) FLOW SENSOR

(75) Inventors: Takao Iwaki, Chiryu (JP); Toshimasa Yamamoto, Bisai (JP); Hiroyuki Wado, Toyota (JP)

(73) Assignee: Denso Corporation, Aichi-Pref. (JP)

( * ) Notice: Subject to any disclaimer, the term of this patent is extended or adjusted under 35 U.S.C. 154(b) by 0 days.

(21) Appl. No.: 10/197,474

(22) Filed: Jul. 18, 2002

(65) Prior Publication Data

US 2003/0015034 A1 Jan. 23, 2003

(30) Foreign Application Priority Data

Jul. 19, 2001 (JP) ........................................ 2001-220174

(51) Int. Cl.[7] ................................................. G01F 1/68
(52) U.S. Cl. ................................................... 73/204.26
(58) Field of Search ....................... 73/204.26, 204.17, 73/204.18, 204.23, 204.25, 204.19

(56) References Cited

U.S. PATENT DOCUMENTS

| | | | | |
|---|---|---|---|---|
| 4,651,564 A | * | 3/1987 | Johnson et al. | ........... 73/204.26 |
| 4,966,037 A | * | 10/1990 | Sumner et al. | ........... 73/204.26 |
| 6,301,960 B1 | * | 10/2001 | Yamakawa et al. | ........ 73/204.26 |
| 6,470,742 B1 | * | 10/2002 | Yamakawa et al. | ........ 73/204.26 |
| 6,536,274 B1 | * | 3/2003 | Zushi et al. | ............. 73/204.26 |

FOREIGN PATENT DOCUMENTS

JP 2000-146656 5/2000

* cited by examiner

Primary Examiner—Edward Lefkowitz
Assistant Examiner—Jewel V. Thompson
(74) Attorney, Agent, or Firm—Nixon & Vanderhye PC

(57) ABSTRACT

A thin-film type flow sensor having a thin-film part in which a plurality of patterned resistor films are sandwiched between a pair of insulator films. The resistance ratios among the resistor films are minimized from one sensor to another made from the same wafer. The flow sensor has a lower insulator film, the resistor films, and an upper film laminated in succession on a substrate. The resistor films include a patterned fluid thermometer, a temperature detector, and a heater. The heater has a wiring configuration in which resistor elements are connected in a parallel manner. The wiring widths of the heater and the thermometer can thus be made identical, so that the resistance ratios become invariant over the wafer surface, irrespective of a disparity in etching variations.

8 Claims, 4 Drawing Sheets

FIG. 6A
RELATED ART
FIG. 6B
RELATED ART
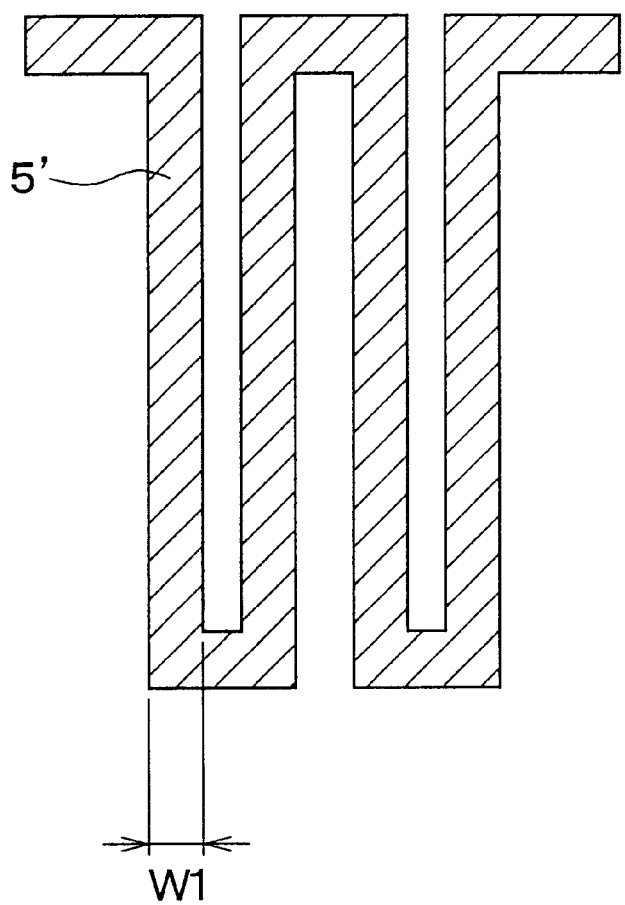
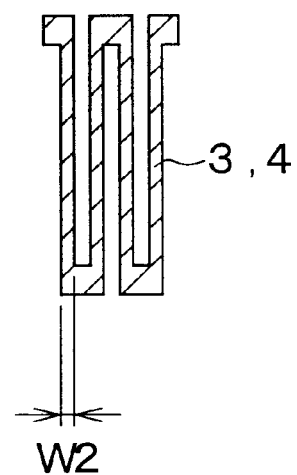

FLOW SENSOR

CROSS REFERENCE TO RELATED APPLICATION

This application relates to and incorporates herein by reference Japanese patent application No. 2001-220174, which was filed on Jul. 19, 2001.

BACKGROUND OF THE INVENTION

The invention relates to a thin-film type flow sensor having a thin-film part in which patterned resistor films are sandwiched between a pair of insulator films.

In general, thin-film type flow sensors have a thin-film part in which a lower insulator film, resistor films made of metal, highly-doped semiconductors, or the like, and an upper insulator film are formed on a substrate in succession to make a lamination. The resistor films consist of a heater and a thermometer (a fluid thermometer and a temperature detector) which are patterned in a wiring configuration.

The proposed examples include one described in Japanese unexamined patent (JP-A) publication No. 2000-146656, in which the temperature of the heater is controlled to a predetermined temperature, which is higher than that detected by the fluid thermometer. The flow rate of fluid is detected from temperature variations of the temperature detector caused by the flow of the fluid.

Such flow sensors are typically mass-produced by the following steps: forming a lower insulator film and a resistor film in succession on a semiconductor wafer; patterning the resistor film by photolithography-based etching; forming an upper insulator film; and then cutting the wafer into chips or substrates.

In the patterning of the resistor film, however, the etching causes variations in the wiring width over the wafer surface. The variations produce the problem that resistance ratios between individual resistor films (between the heater and the thermometer films, between heater films, or between thermometer films) of one chip, or sensor, (hereinafter, referred to as in-chip resistance ratios) vary greatly from those of another chip (the ratios vary from one sensor to another).

The flow sensors can detect the flow rate of fluid, for example, with bridge circuitry or the like formed with the individual resistor films. The resistance ratios between the resistor films thus have a large impact on the sensitivities of the sensors. Consequently, when the in-chip resistance ratios of the mass-produced chips vary greatly, output correction and other processing of external control circuits may be complicated.

The same problems also occur when ratios of TCR (thermal coefficient of resistance) among the resistor films of a single chip vary greatly from one chip to the next.

The inventors have studied the causes of these variations in the in-chip resistance ratio and TCR ratio. The resistances are determined by the thicknesses and wiring widths of the resistor films. The values of TCR also depend on the thicknesses and wiring widths. The thickness, in turn, depends on the film forming apparatus. Although the thickness varies greatly over a wafer surface, e.g., between the wafer center and periphery, the thickness varies only slightly within each chip; thus the variation hardly affects the in-chip resistance ratios and TCR ratios.

The wiring width depends on variations in the etching of the resistor film. The variations of the wiring width are attributed to the following factors: 1) The differences between the line widths of the mask used in the photolithography and the widths of the lines actually etched (hereinafter, referred to as etching variations) vary over a wafer surface; and 2) The magnitudes of the etching variations and the contributions of the etching variations to the resistances and TCRs differ between resistor films of greater line width and those of smaller line width.

Conventional flow sensors typically have resistor films as shown in FIGS. 6A and 6B. That is, a heater film 51 is given as great a wiring width as possible in order to generate heat at lower voltages. Meanwhile, thermometers 3 and 4 are given as small a wiring width as possible since higher voltages are to be obtained under smaller currents for the sake of less heat generation. Hence, the variations in wiring width caused by etching have a greater impact on the thermometer films 3, 4, which have a narrower wiring width, than on the heater film 5', which has a greater wiring width.

Consequently, as far as factor 2) is concerned, resistor films of narrower wiring widths are more susceptible to the etching variations mentioned above. In addition, the values of the etching variations differ largely between heaters and thermometers. Thus, the in-chip resistance ratios vary greatly from one chip to the next.

For example, in FIGS. 6A and 6B, suppose that the heater film 5' has a wiring width W1 of 20 $\mu$m and the thermometer films 3, 4 have a wiring width W2 of 3 $\mu$m. The etching variations near the wafer center shall be 0.1 $\mu$m for the heater film 5' and 0.3 $\mu$m for the thermometer films 3, 4. On the wafer periphery, the etching variations shall be 0.15 $\mu$m for the heater film 5' and 0.45 $\mu$m for the thermometer films 3, 4.

As for the in-chip resistance ratios, the ratio between the resistance of the heater film 5' and that of the thermometer films 3, 4 ((heater resistance)/(thermometer resistance)) is considered. A chip cut from a location near the wafer center has an in-chip resistance ratio x1 of ((20−0.1)/(3−0.3)), and a chip cut out of the wafer periphery an in-chip resistance ratio x2 of ((20−0.15)/(3−0.45)).

The ratio between the two resistance ratios x1 and x2, or x1/x2, is 0.947. As seen above, the narrow and wide wiring widths differ in the degree of contribution of the etching variation to the resistance ratios near the wafer center and on the wafer periphery. The in-chip resistance ratio thus varies greatly over the wafer surface, i.e., from one chip to another. The same is true for the TCR ratios. The reason is that TCR depends on line widths (the greater the line width, the greater the TCR).

SUMMARY OF THE INVENTION

In view of the foregoing problems, it is an object of the present invention to provide a flow sensor that includes a lower insulator film, resistor films, which include a patterned heater and thermometer, and an upper insulator film laminated in succession on a substrate cut from a wafer, wherein the variation from one chip to another of in-chip resistance ratios and in-chip TCR ratios are minimized.

As mentioned above, narrow sections and wide sections of wiring differ in the degree of etching variations between locations near the center and locations near the periphery of the wafer. The etching variations depend on the line width and line spacing of the resistor films. When all the resistor films have the same line width and line spacing, the in-chip resistance ratios are supposed to be invariant between chips, even if the values of the etching variations differ over the wafer surface.

Thus, in the foregoing example described in conjunction with FIGS. 6A and 6B, suppose the line width of the heater film 5' and the line widths of the thermometer films 3, 4, or W1 and W2, are both set at 3 μm, for instance. The ratio x1/x2 is expressed as {(3−0.3)/(3−0.3)}/{(3−0.45)/(3−0.45)}=1. In this case, the disparity in the values of etching variations within the wafer surface is cancelled to make the in-chip resistance ratios invariant from one chip to the next, or from one sensor to another.

In addition to the findings from the study of the inventors, the present invention has been achieved with consideration also given to the fact that the above-mentioned problems occur because both wide and narrow sections of the resistor films in earlier, conventional flow sensors are formed by a single, contiguous line, or strip.

That is, according to a first aspect of the present invention, a flow sensor includes a lower insulator film, resistor films, and an upper insulator film laminated on a substrate such that the resistor films are located between the insulator films. The resistor films include a patterned heater and thermometer. At least a section of one of the resistor films has a wiring configuration in which resistor elements are connected in a parallel manner.

The resistor films of earlier devices have contained sections of different wiring widths; that is, wide and narrow. In contrast, according to the present invention, the resistor films that previously were relatively wide have been configured as a plurality of resistor elements connected in a parallel manner. The wiring width of the individual resistor elements can thus be made the same as that of the relatively narrow sections. In short, all the resistor films will have identical wiring widths.

Thus, the disparity in the etching variations over the wafer surface, which have been due to differences in wiring widths, can be minimized by adopting the configuration of the present invention. According to the present invention, the variation from one chip to the next of resistance ratios and TCR ratios can be minimized.

In a second aspect of the present invention, at least part of the heater, which is one of the resistor films, has a wiring configuration in which a plurality of resistor elements are connected in a parallel manner.

As stated previously, the heater resistor film typically is the part that requires a greater wiring width than the other resistor films, such as the thermometer. According to the present invention, at least part of the heater has a wiring configuration such that resistor elements of a plurality of resistor elements are connected in a parallel manner. The wiring widths of the individual resistor films will thus be identical, which achieves the effect of the first aspect of the invention.

In a third aspect of the invention, at least part of the thermometer, which is included in the resistor films, has a wiring configuration in which a plurality of resistor elements are connected in a parallel manner.

In earlier devices, the wiring width of the thermometer was increased when there was a need to reduce the resistance of the thermometer. In some cases, the wiring width of the thermometer was even greater than that of the heater. The present invention is suitable for such cases. At least part of the thermometer is has a wiring configuration in which a plurality of resistor elements are connected in a parallel manner, thus the wiring widths of the individual resistor films are essentially identical. This achieves the effect of the first aspect of the invention.

In a fourth aspect of the invention, at least one of the heater and the thermometer has a wiring configuration such that resistor elements are connected in a parallel manner.

Here, the heater and the thermometer may both have a section that includes parallel resistor elements of the same wiring width.

As a result, at least part of the heater and part the thermometer each have a wiring configuration in which a plurality of resistor elements are connected in a parallel manner. The heater and the thermometer will both have same wiring width. Consequently, according to the present invention, variation from one chip to the next of the resistance ratios and TCR ratios of the resistor films of the same chip can be minimized.

BRIEF DESCRIPTION OF THE DRAWINGS

FIG. 6A is a diagrammatic plan view showing the planar pattern of a conventional heater; and FIG. 6B is a diagrammatic plan view showing the planar pattern of a conventional thermometer.

DETAILED DESCRIPTION OF THE PREFERRED EMBODIMENTS

Figure 2:
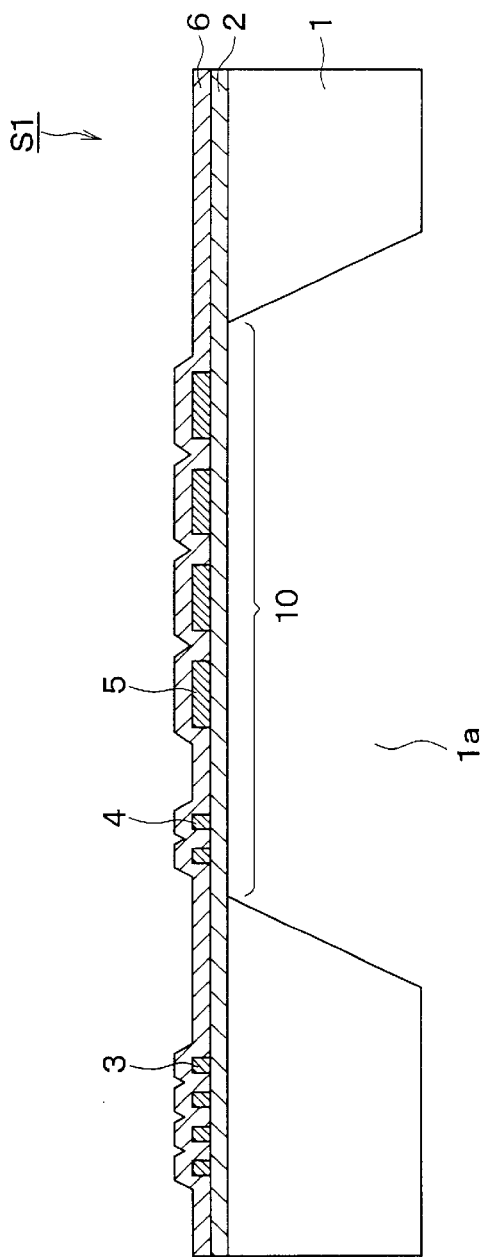
FIG. 2 is a diagrammatic cross sectional view taken along the line 2—2 of FIG. 1.

Reference numeral 1 represents a substrate consisting of a semiconductor substrate made of silicon monocrystal or the like. In the present embodiment, as shown in FIG. 2, the substrate 1 has a hollow 1a on one side.

A lower insulator film 2 is formed on one side of the substrate 1 adjacent to the hollow 1a. The lower insulator film 2 may be an insulative silicon nitride film (SiN), silicon oxide film ($SiO_2$), or the like. In the present embodiment, the film 2 is made of a silicon nitride film and a silicon oxide film which are laminated from the substrate in this order.

A fluid thermometer film 3, a temperature detector film (flow rate detecting element) 4, and a heater film (heating element) 5 are formed on the lower insulator film 2. The films 3, 4, 5 are formed as resistor films made of metals such as platinum (Pt), nickel-chromium alloy (NiCr), and tungsten W, polysilicon, or the like (platinum is preferred in the present embodiment). Of the resistor films 3, 4, 5, the fluid thermometer film 3 and the temperature detector film 4 constitute a thermometer of the flow sensor S1.

Figure 1:
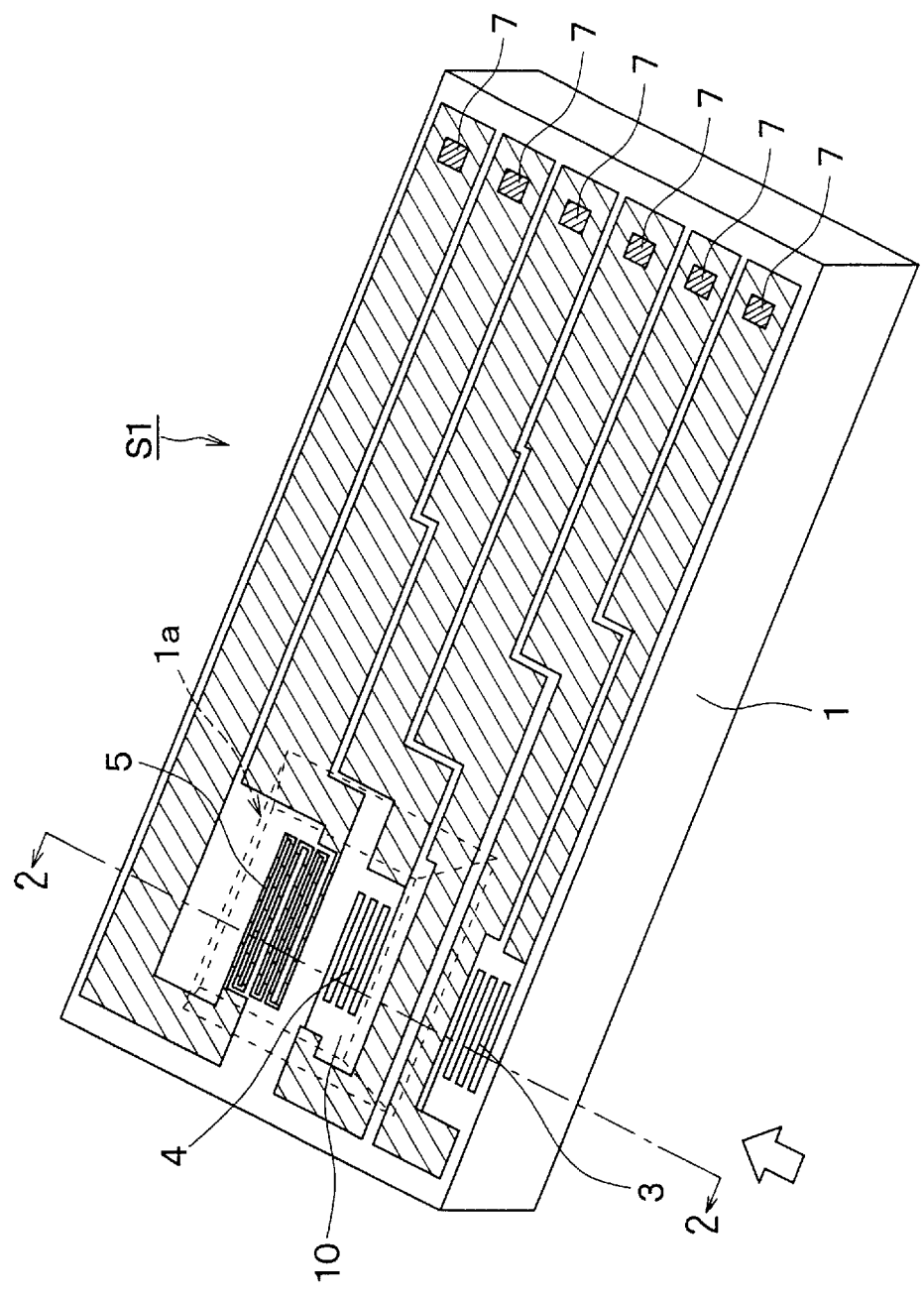
FIG. 1 is a perspective view, in which insulation layers have been removed for purposes of illustration, of a flow sensor according to one embodiment of the invention.
Figure 3:
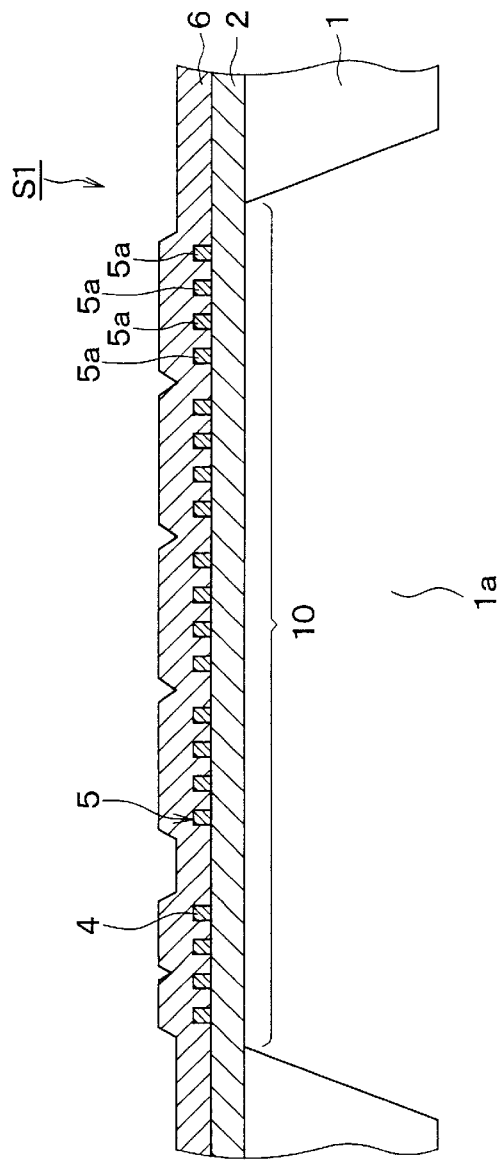
FIG. 3 is a diagrammatic cross sectional view that is an enlargement of the central part of FIG. 2.
Figure 4A:
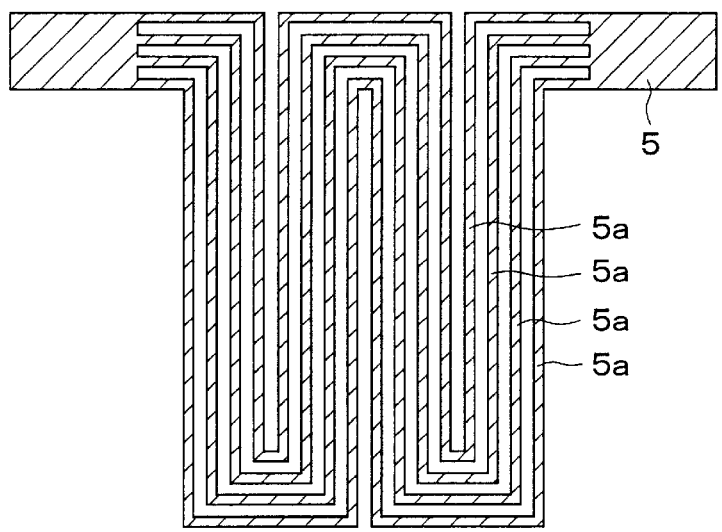
FIG. 4A is a diagrammatic plan view showing the planar pattern of the heater of the device of FIG. 1.
Figure 4B:
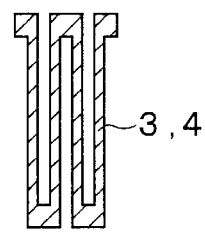
FIG. 4B is a diagrammatic plan view showing the planar pattern of the thermometer of the device of FIG. 1.

As shown in FIG. 1, the resistor films 3, 4, 5 of the present embodiment are patterned to meander in a plane. FIG. 4A shows the pattern of the heater film 5, and FIG. 4B shows the pattern of the thermometer films 3, 4. As shown in FIG. 4A and FIG. 3, the heater film 5 has a configuration such that the resistor elements 5a of a plurality (four, in FIG. 4) of resistor elements are connected in a parallel manner.

As shown in FIG. 4A, each of the widths of the individual resistor elements 5a of the heater 5 is the same as that of the thermometer films 3, 4 (for example, 3 μm). That is, the heater 5 has a wiring configuration such that a plurality of resistor elements 5a are connected in a parallel manner, and that the widths of the wiring strips of the heater film 5 and that of the thermometer films 3, 4 are identical.

In the present embodiment, the fluid thermometer film 3, the temperature detector film 4, and the heater film 5 are arranged in this order from upstream to downstream in the direction of fluid flow (the direction of flow is shown by an arrow in FIG. 1). The fluid thermometer film 3 is intended to detect the temperature of the fluid and is well spaced away from the heater film 5 so that the heat from the heater film 5 does not affect the temperature detection. The heater film 5 is controlled by a control circuit (not-shown) to a reference temperature that is higher by a certain degree than the temperature detected at the fluid thermometer film 3.

An upper insulator film 6 is formed over the resistor films 3, 4, 5 and the lower insulator film 2. Like the lower insulator film 2, the upper insulator film 6 may be an insulative silicon nitride film (SiN), silicon oxide film ($SiO_2$), or the like. In the present embodiment, the upper insulator film 6 is made of a silicon nitride film and a silicon oxide film, which ate laminated from the substrate 1 in this order.

As shown in FIG. 1, the resistor films 3, 4, 5 are routed to an end of the substrate 1. Pads 7 made of gold, aluminum, or the like are formed on the routing terminals. The resistor films 3, 4, 5 are then electrically connected to the control circuit or the like through the pads 7 and by wire bonding, for example. The pads 7 are electrically connected to the respective resistor films 3, 4, 5 through openings (not-shown) formed in the upper insulator film 6.

In the present embodiment, the lower insulator film 2, the resistor films 3, 4, 5, and the upper insulator film 6 are thus laminated in succession on the substrate 1. In addition, above the hollow 1a in the substrate 1, the temperature detector film 4 and heater film 5 are sandwiched and laminated between the lower insulator film 2 and the upper insulator film 6 to form a membrane (thin-film structure part) 10.

In the flow sensor S1, the heater film 5 is activated to rise to a temperature that is a certain degree higher than the fluid temperature obtained from the fluid thermometer film 3. When the fluid flows in the forward direction shown by the arrow of FIG. 1, the temperature of the detector film 4 falls due to removal of heat. If the flow is reversed, opposite to the direction of the arrow, the temperature detector film 4 rises due to transferred heat. Then, the temperature difference between the temperature detector film 4 and the fluid thermometer film 3 is used to detect the flow rate and the direction of flow. The temperatures are measured (detected) from changes in the resistances of the metal wiring constituting the fluid thermometer film 3 and the temperature detector film 4.

A method of fabricating the foregoing flow sensor S1 of the present embodiment will be described with reference to FIG. 2. Initially, a monocrystalline silicon substrate (Si row stone) 1 is prepared as the substrate.

The substrate 1 is in a wafer state, not yet divided into chips. For instance, this wafer is a 6-inch disc, which is finally cut into chips (substrates) that are each approximately 3 mm×6 mm in size. The following steps are applied to the wafer before dicing.

A silicon nitride film is formed on one side of the substrate 1 in the wafer state by plasma enhanced CVD (PE-CVD), low pressure CVD (LP-CVD), or other methods. A silicon oxide film is formed thereon by PE-CVD or the like. This forms the lower insulator film 2 (lower insulator film forming step).

Next, a platinum film, the material of the resistor films 3, 4, 5, is deposited on the lower insulator film 2 by vapor deposition, sputtering, or other method. The platinum film is etched by, for example, photolithography-based ion milling, to pattern the shapes of the resistor films 3, 4, 5 (resistor film forming step).

Next, a silicon oxide film is formed over the resistor films 3, 4, 5 and the lower insulator film 2 by PE-CVD or the like. Then, a silicon nitride film is formed on this silicon oxide film by plasma enhanced CVD, low pressure CVD, or the like. This forms the upper insulator film 6 (upper insulator film forming step). Subsequently, openings for forming the pads 7 are formed in the upper insulator film 6, and the pads 7 are formed by vapor deposition, sputtering, or the like.

Next, a mask material (for example, a silicon oxide film or silicon nitride film, not shown) is applied to the back of the silicon substrate 1, followed by etching, to make an opening corresponding to the hollow 1a mentioned above. The silicon substrate 1 is then etched an isotropically from the backside to form the hollow 1a until the undersurface of the lower insulator film 2, or the silicon nitride film, is exposed in the hollow 1a.

End point detection is effected, for example, by using tetramethylammonium hydroxide (TMAH) as the etching solution. The use of TMAH can facilitate the detection of the end of etching because the silicon nitride film has a much smaller etch rate than silicon.

Subsequently, the substrate 1 in the wafer state is diced into separate chips (dicing step). In this way, the flow sensor S1 shown in FIGS. 1 and 2 can be appropriately fabricated in a plurality of pieces, i.e., mass-produced.

As stated previously, the heater film 5 has conventionally been the part that has a greater wiring width than the other resistor films, or the thermometer film 3, 4. According to the present embodiment, the heater film 5 is configured such that resistor elements 5a of a plurality of resistor elements are connected in a parallel manner. The wiring width of the heater film 5 (that is, the wiring width of each of the individual resistor elements 5a) and the wiring width of each the thermometer films 3, 4 are generally identical.

Thus, disparity in the etching variations within the same chip, which has been seen due to the difference in the wiring width between the heater and the thermometer, can be eliminated. That is, the configuration of the present embodiment can make the fluid thermometer film 3, the temperature detector film 4, and the heater film 5 generally identical in etching variations within the same chip.

According to the present embodiment, variation from one chip to the next of the resistance ratios among the fluid thermometer film 3, the temperature detector film 4, and the heater film 5 (i.e., resistance ratios among the resistor films 3, 4, 5) and of the TCR ratios can be minimized. In consequence, sensors S1 having uniform characteristics can be mass-produced.

For example, as described in connection with the ratio x1/x2, a flow sensor S1 or chip cut from near the center of a wafer and a flow sensor S1 or chip cut from the wafer periphery can be made generally identical in the resistance ratios and TCR ratios among their respective resistor films 3, 4, 5.

Other Embodiments

Figure 5:
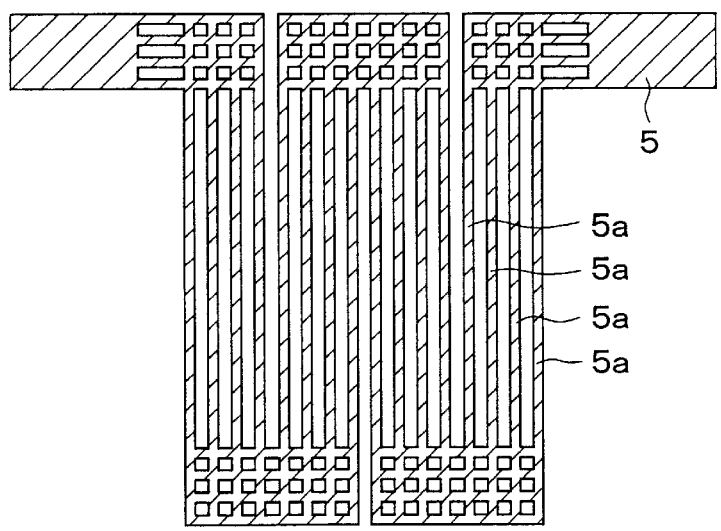
FIG. 5 is a diagrammatic plan view showing an modified example of the wiring configuration in which a plurality of resistor elements are connected in a parallel manner.

The wiring configuration of the heater film 5, in which a plurality of resistor elements 5a are connected in a parallel manner, may be as shown in FIG. 5. In FIG. 5, the turning portions of the heater film 5 have a lattice configuration in which individual resistor elements 5 cross each other.

It is sometimes necessary that the thermometer films 3, 4 have a greater wiring width than the heater in situations where the resistance of the thermometer must be reduced. In such cases, not the heater film 5 but the thermometer film 3, 4 may be formed, at least in part, into a wiring configuration in which individual resistor elements are connected in a parallel manner.

In this case, the wiring widths of the resistor films 3, 4, 5 can be generally identical as in the first embodiment, thus achieving the same effects. Both the heater film 5 and the thermometer films 3, 4 may have a wiring configuration in which individual resistor elements are connected in a parallel manner.

In short, the present invention is characterized chiefly in that at least one of the resistor films has a section in which individual resistor elements are connected in a parallel manner. The resistor films thus all have a generally identical wiring width so that etching variations among the resistor films over the wafer surface are comparable.

What is claimed is:

1. A flow sensor comprising:
    a lower insulator film;
    a plurality of resistor films, wherein the resistor films include a patterned heater and thermometer, and wherein at least a section of at least one of the resistor films has a wiring configuration in which resistor elements of a plurality of resistor elements are connected in a parallel manner; and
    an upper insulator film, wherein the resistor films are laminated with and located between the upper insulator film and the lower insulator film.

2. The flow sensor of claim 1, wherein the section is at least a part of the heater.

3. The flow sensor of claim 2, wherein the thermometer has a substantially uniform wiring width, and the wiring width of the thermometer is the same as that of each of the resistor elements.

4. The flow sensor of claim 1, wherein the section is at least a part of the thermometer.

5. The flow sensor of claim 1, wherein the width of each of the resistor elements is substantially the same as that of the other resistor elements.

6. The flow sensor of claim 1, wherein the resistor films lie in the same plane and are spaced from one another in a predetermined order.

7. A flow sensor comprising:
    a lower insulator film;
    a plurality of resistor films, wherein the resistor films include:
        a patterned heater; and
        a patterned thermometer, wherein at least one of the thermometer and the heater has a wiring configuration in which a plurality of resistor elements are connected in a parallel manner, wherein the wiring width of the thermometer is the same as that of the heater; and
    an upper insulator film, wherein the resistor films are laminated with and located between the upper insulator film and the lower insulator film.

8. A flow sensor comprising:
    a lower insulator film;
    a plurality of resistor films, wherein the resistor films include:
        a patterned heater, which is defined by wiring strips; and
        a patterned thermometer, which is defined by wiring strips, wherein at least one of the thermometer and the heater has a wiring configuration in which a plurality of resistor elements, which are defined by wiring strips, are connected in a parallel manner, wherein the width of each of the strips defining the thermometer is the same as that of the strips defining the heater; and
    an upper insulator film, wherein the resistor films are laminated with and located between the upper insulator film and the lower insulator film.

* * * * *